(12) United States Patent
Surnilla et al.

(10) Patent No.: US 9,303,577 B2
(45) Date of Patent: Apr. 5, 2016

(54) METHOD AND SYSTEM FOR ENGINE COLD START AND HOT START CONTROL

(71) Applicant: Ford Global Technologies, LLC, Dearborn, MI (US)

(72) Inventors: Gopichandra Surnilla, West Bloomfield, MI (US); Steven Schwochert, Garden City, MI (US); Peter C. Moilanen, Clinton, MI (US); Eric Krengel, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 507 days.

(21) Appl. No.: 13/720,760

(22) Filed: Dec. 19, 2012

(65) Prior Publication Data

US 2014/0172275 A1    Jun. 19, 2014

(51) Int. Cl.
*F02D 41/06* (2006.01)
*F02D 41/30* (2006.01)
*F02D 41/40* (2006.01)

(52) U.S. Cl.
CPC .......... *F02D 41/062* (2013.01); *F02D 41/3094* (2013.01); *F02D 41/402* (2013.01); *F02D 41/064* (2013.01); *F02D 41/065* (2013.01); *F02D 41/403* (2013.01); *F02D 2250/38* (2013.01); *Y02T 10/44* (2013.01)

(58) Field of Classification Search
CPC . F02D 41/062–41/065; F02D 41/402–41/405; F02D 41/3094; F02D 41/36; F02D 41/1446
USPC .......... 701/103, 104, 113; 123/299, 304, 366, 123/497, 179.16, 575–578, 435, 676, 491
See application file for complete search history.

(56) References Cited

U.S. PATENT DOCUMENTS

| | | | | |
|---|---|---|---|---|
| 6,804,952 | B2 * | 10/2004 | Sasaki et al. | ..... 60/284 |
| 7,082,926 | B2 * | 8/2006 | Sadakane et al. | ..... 123/431 |
| 7,198,031 | B2 | 4/2007 | Saito et al. | |
| 7,234,440 | B2 * | 6/2007 | Hilditch | ..... 123/305 |
| 7,270,112 | B2 | 9/2007 | Kinose | |

(Continued)

FOREIGN PATENT DOCUMENTS

| | | |
|---|---|---|
| CA | 2809298 A1 | 5/2013 |
| EP | 1859142 B1 | 2/2006 |

(Continued)

OTHER PUBLICATIONS

Surnilla, Gopichandra et al., "Method and System for Engine Control," U.S. Appl. No. 13/854,840, filed Apr. 1, 2013, 58 pages.

(Continued)

*Primary Examiner* — Lindsay Low
*Assistant Examiner* — Robert Werner
(74) *Attorney, Agent, or Firm* — Julia Voutyras; Alleman Hall McCoy Russell & Tuttle LLP

(57) ABSTRACT

Methods and systems are provided for controlling exhaust emissions by adjusting an injection profile for fuel injected into an engine cylinder from a plurality of fuel injectors during engine start and crank. By splitting injection of fuel during start so that a portion of fuel is port injected and a remaining portion is direct injected as one or multiple injections, the soot load of the engine can be reduced and fuel economy can be improved.

18 Claims, 4 Drawing Sheets

(56) References Cited

U.S. PATENT DOCUMENTS

| | | | |
|---|---|---|---|
| 7,314,036 B2 | 1/2008 | Altenschmidt | |
| 7,318,420 B2 * | 1/2008 | Kinose | 123/479 |
| 7,412,821 B2 | 8/2008 | Araki et al. | |
| 7,415,348 B1 | 8/2008 | Ramappan et al. | |
| 7,549,408 B2 | 6/2009 | Russell | |
| 7,599,787 B2 | 10/2009 | Hokuto et al. | |
| 7,694,507 B2 | 4/2010 | Tokuda | |
| 7,712,451 B2 | 5/2010 | Hung et al. | |
| 7,769,527 B2 | 8/2010 | Noda et al. | |
| 7,810,463 B2 * | 10/2010 | Otterspeer et al. | 123/179.1 |
| 7,894,973 B2 * | 2/2011 | Mallebrein et al. | 701/104 |
| 8,100,107 B2 * | 1/2012 | Bidner et al. | 123/299 |
| 8,132,555 B2 * | 3/2012 | Lewis et al. | 123/305 |
| 2006/0096575 A1 | 5/2006 | Araki et al. | |
| 2007/0068485 A1 | 3/2007 | Hilditch | |
| 2007/0119414 A1 | 5/2007 | Leone et al. | |
| 2007/0215110 A1 | 9/2007 | Stein et al. | |
| 2009/0099756 A1 | 4/2009 | Demura | |
| 2009/0229570 A1 | 9/2009 | Ulrey et al. | |
| 2011/0162620 A1 | 7/2011 | Bidner et al. | |

FOREIGN PATENT DOCUMENTS

| | | |
|---|---|---|
| EP | 1881192 A1 | 3/2006 |
| EP | 2256321 A2 | 12/2010 |
| WO | 2012028944 A1 | 3/2012 |
| WO | 2013075234 A1 | 5/2013 |

OTHER PUBLICATIONS

Surnilla, Gopichandra et al., "Method for Fuel Injection Control," U.S. Appl. No. 14/189,900, filed Feb. 25, 2014, 45 pages.

Surnilla, Gopichandra et al., "Method and System for Engine Control," U.S. Appl. No. 13/854,835, filed Apr. 1, 2013, 50 pages.

* cited by examiner

METHOD AND SYSTEM FOR ENGINE COLD START AND HOT START CONTROL

FIELD

The present application relates to methods and systems for controlling fuel injection in an engine system.

BACKGROUND AND SUMMARY

Engines may be configured with direct fuel injectors that inject fuel directly into a combustion cylinder (direct injection), and/or with port fuel injectors that inject fuel into a cylinder port (port fuel injection). Direct injection allows higher fuel efficiency and higher power output to be achieved in addition to better enabling the charge cooling effect of the injected fuel.

Direct injected engines, however, also generate more particulate matter emissions (or soot) due to diffuse flame propagation wherein fuel may not adequately mix with air prior to combustion. Since direct injection, by nature, is a relatively late fuel injection, there may be insufficient time for mixing of the injected fuel with air in the cylinder. Similarly, the injected fuel may encounter less turbulence when flowing through the valves. Consequently, there may be pockets of rich combustion that may generate soot locally, degrading exhaust emissions.

One approach for reducing particular matter emissions generated by direct injection of fuel is shown by Bidner et al. in US2011/0162620. Therein, an amount of fuel injected into the cylinder, between the direct injector and the port fuel injector, is adjusted based on the amount of particulate matter (PM) produced by the engine. For example, as a soot load increases, a fuel injection amount from the direct injector is decreased while a fuel injection amount from the port injector is correspondingly increased.

However, the inventors herein have identified potential issues with such an approach. During selected engine operating conditions, even with the shift towards more direct injection, particular matter emissions may not be sufficiently reduced to meet the mandated low PM emission standards. For example, the direct injection may be performed too late such that by the time the direct injection occurs, the emitted PMs are higher than emission standards.

The above issues may be at least partly addressed by a method for an engine comprising: during a first combustion event since engine start, port injecting a portion of fuel during a closed intake valve event; and direct injecting a remaining portion of the fuel over multiple injections of the first combustion event. In this way, benefits from an injection split between a port injection and a direct injection, as well as benefits from multiple direct injections can be synergized.

In one example, during an engine start, an engine control system may inject fuel into a cylinder, on the first cylinder combustion event, as a first port injection delivered during a closed intake valve event (e.g., during an exhaust stroke), a second direct injection delivered during a compression stroke, and a third direct injection during an intake stroke. This may constitute a first injection profile. The same injection profile may be continued during cranking for a number of combustion events, based on the cylinder event number (e.g., up to cylinder event number 24). By injecting a portion of the fuel as a port injection and a remaining portion of the fuel as a direct injection, an exhaust catalyst temperature can be rapidly increased to a light-off temperature, improving engine performance at engine cold-starts. By also splitting the direct injection so that some of the direct injected fuel is injected during the compression stroke and the remaining part of the direct injected fuel is injected during the intake stroke, the catalyst light-off temperature can be attained without raising exhaust particulate matter (PM) emissions and degrading engine combustion stability. At the same time fuel economy is improved. After a target cylinder combustion event number is reached, the injection profile may be transitioned to a second injection profile that is configured for idle engine speed control. The second injection profile may include, for example, only port injection of fuel, only direct injection of fuel, and/or a split ratio that is different from the split ratio of the first injection profile, with a higher percentage of direct injected fuel. In still further embodiments, the injection profile during an engine cold start may vary based on the engine temperature at the cold start (e.g., based on whether it is a regular temperature engine cold start or a very cold temperature engine cold start).

In this way, by using a split injection profile that splits a fuel injection between a port injection and multiple direct injections, an activation time for an exhaust catalyst can be reduced while producing lower gaseous and particulate matter emissions. At the same time, a higher amount of spark retard can be tolerated without affecting combustion stability. As such, this allows fuel injection to be optimized so as to enable the benefits of a fuel injection split between a port injection and direct injection to be synergized with the benefits of multiple direct injections. Overall, engine performance is improved, exhaust emissions are improved, and further, fuel economy is also improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
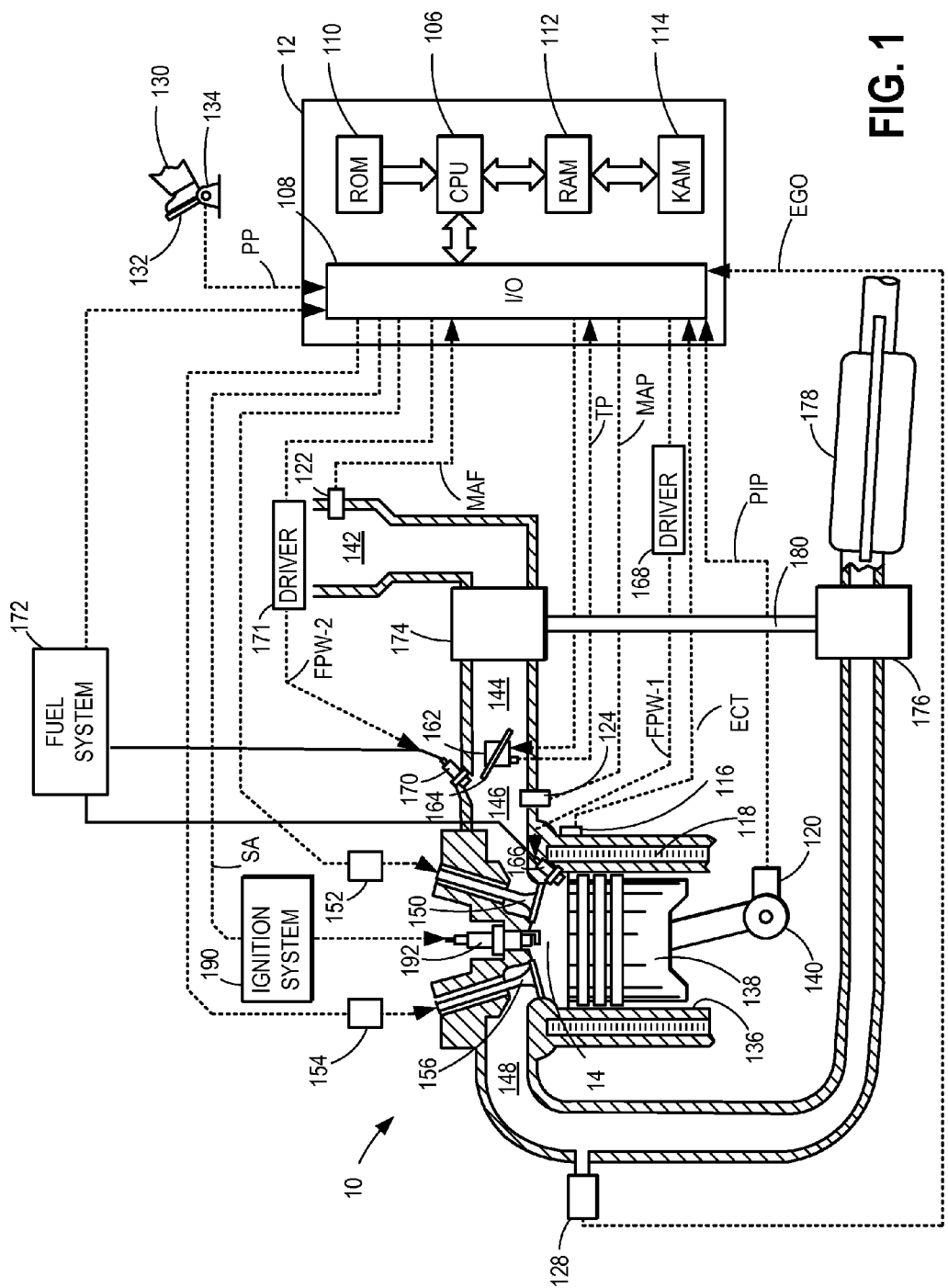
FIG. 1 shows an example combustion chamber.

The following description relates to systems and methods for adjusting an engine fuel injection, such as in the engine system of FIG. 1, during engine start and crank to reduce a soot load of the engine. An engine controller may perform a control routine, such as the routine of FIG. 2, to adjust a fuel injection profile, including an amount of fuel port injected to a cylinder and an amount of fuel direct injected over multiple injections into the cylinder, during an engine start and during cranking. The profile may be adjusted based on each of an exhaust catalyst temperature and a cylinder event number so as to expedite catalyst activation while reducing exhaust PM emissions and without degrading combustion stability. By using a fuel injection profile from a profile having a relatively higher amount of port injection during engine start and crank, and then transitioning to a fuel injection profile having a relatively higher amount of compression stroke direct injection, an engine cold-start performance can be increased while lowering an engine soot load and without degrading engine fuel economy. Example adjustments are shown at FIGS. 3-4.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation.

Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

Figure 2:
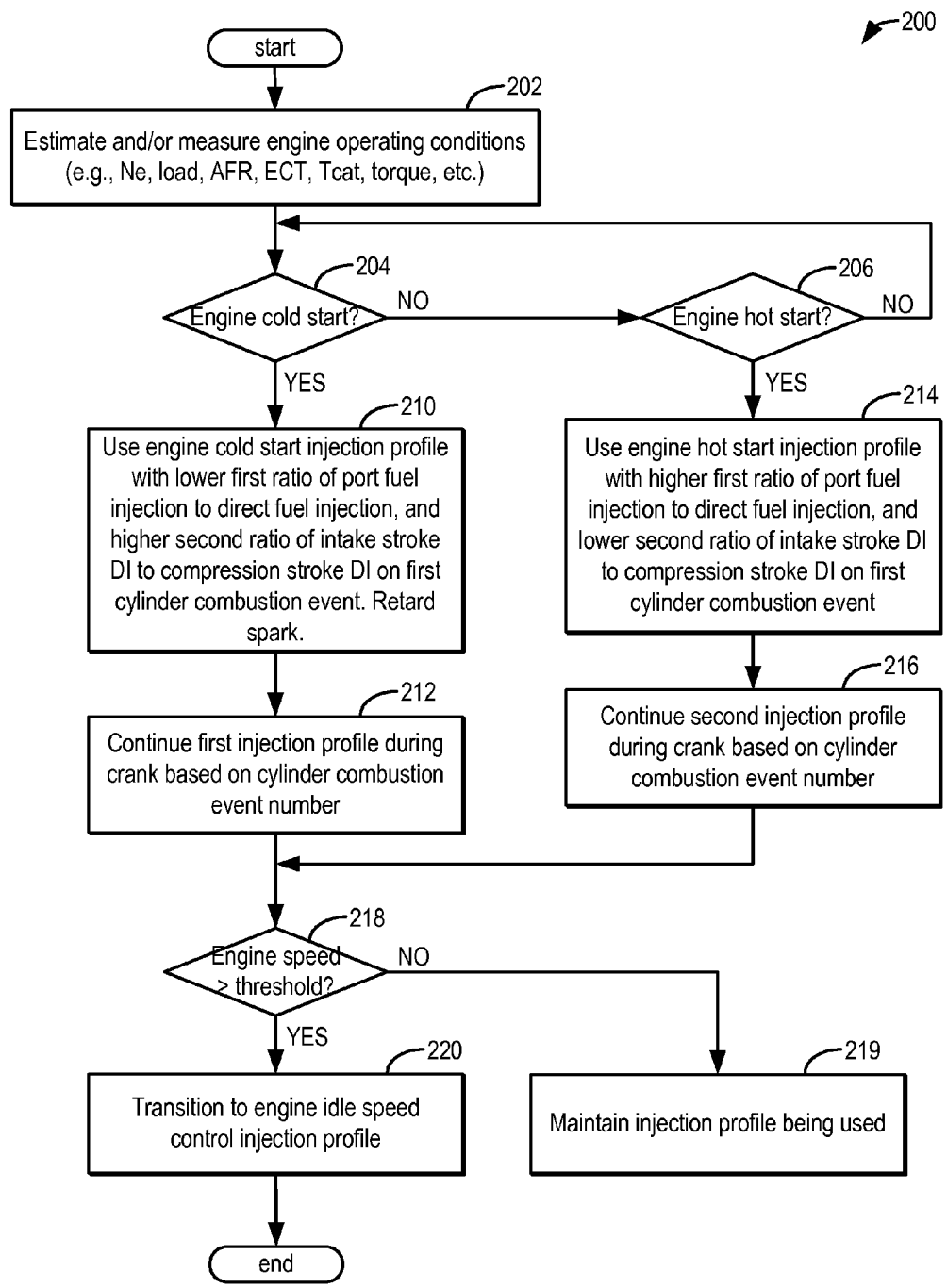
FIG. 2 shows a high level flow chart for adjusting fuel injection during engine start and crank operations to reduce an engine soot load.
Figure 3:
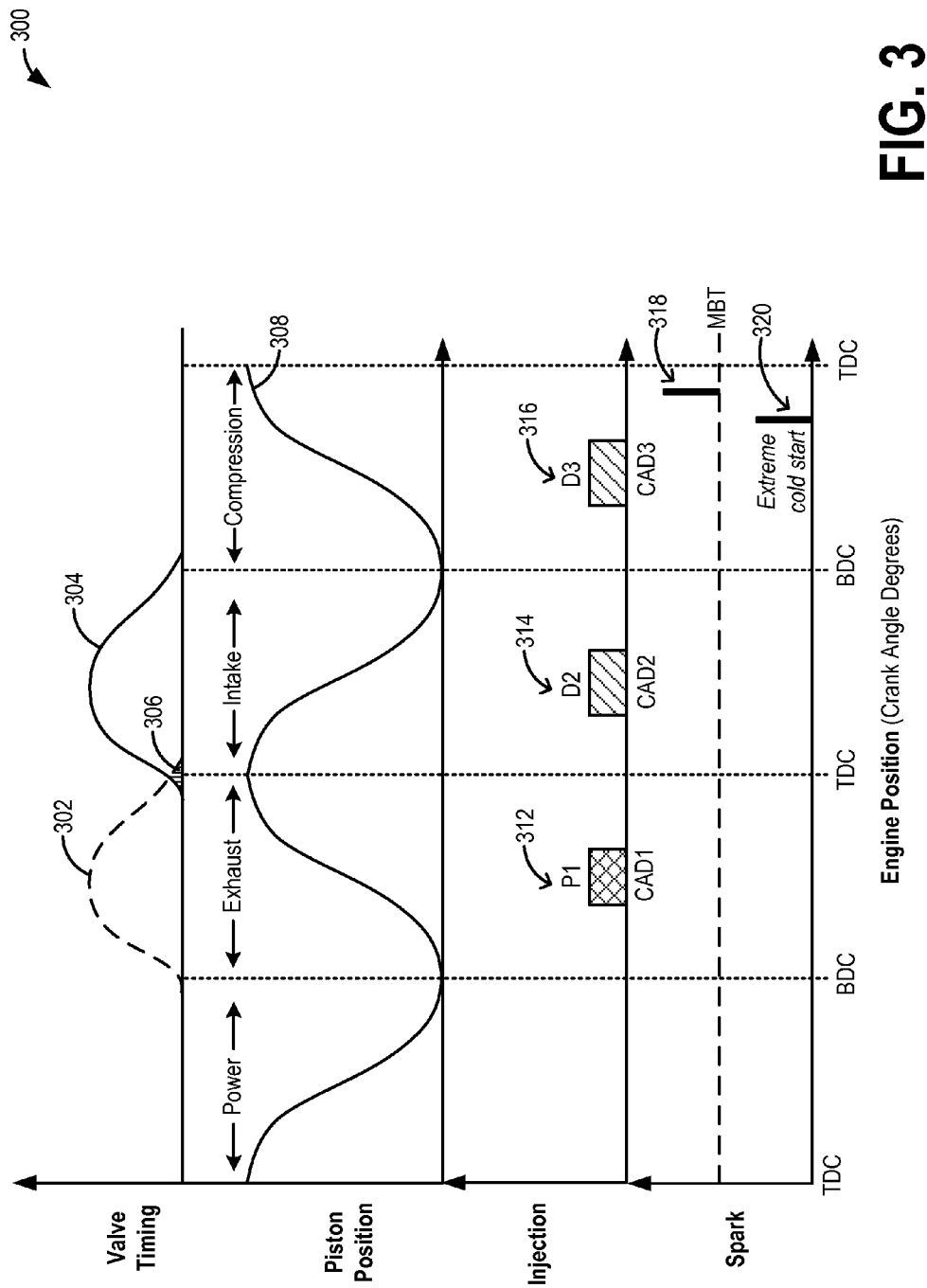
FIGS. 3-4 show example fuel injection profiles used during different engine start and crank operations, according to the present disclosure.
Figure 4:
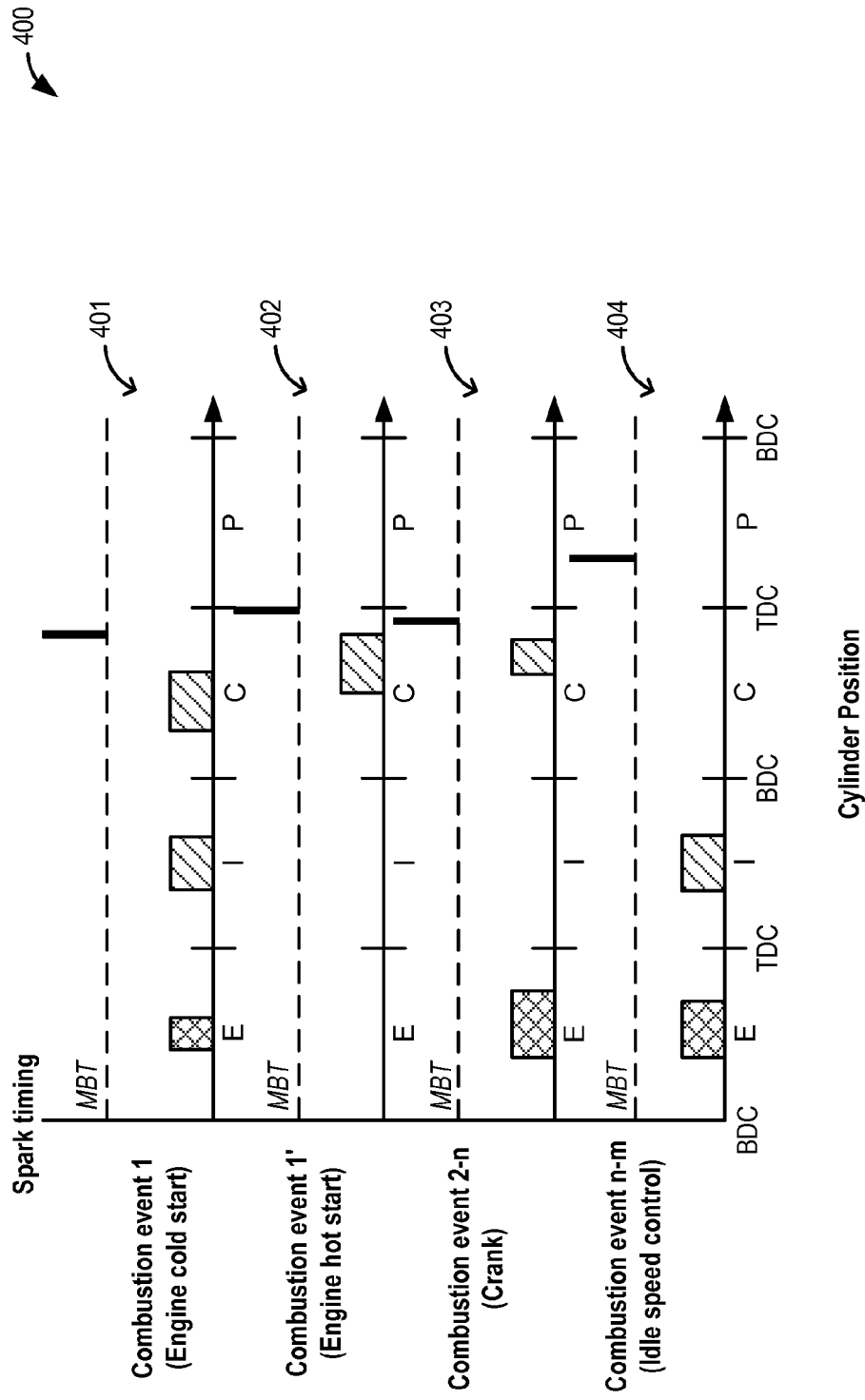

As elaborated with reference to FIGS. 2-4, a controller may adjust a fuel injection profile during a first cylinder combustion event at engine start (in particular, an engine cold start), so as to take synergistic advantage of both a port injection and multiple direct injections to expedite exhaust catalyst activation without increasing an engine soot load and while also providing fuel economy benefits. The first injection profile used at the engine start may have a predetermined first and second injection ratio that enables catalyst temperature control. The first injection profile may be continued into engine crank until a target cylinder event number since the first combustion is reached. Then, fuel injection may be transitioned to a second, different injection profile, having a different first and second injection ratio that enables idle engine speed control.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tank in fuel system 172 may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 2.

Now turning to FIG. 2, an example routine 200 is shown for controlling a fuel injection to an engine cylinder including a (first) port injector and a (second) direct injector based on an amount of particulate matter produced by the engine.

At 202, engine operating conditions may be estimated and/or measured. These may include, for example, engine speed, engine load, cylinder air-to-injected fuel ratio (AFR), engine temperature (for example, as inferred from an engine coolant temperature), exhaust temperature, catalyst temperature (Tcat), desired torque, boost, etc.

At 204, it may be determined whether an engine cold-start condition is present. As such, an engine cold-start may include an initial engine start from shutdown conditions. In one example, an engine cold-start condition may be confirmed if an engine temperature is below a threshold and a catalyst temperature is below a threshold (such as below a light-off temperature). If an engine cold-start condition is not confirmed, at 206, an engine hot-start condition may be confirmed. As such, the engine hot-start may include an engine restart wherein the engine is restarted soon after a preceding engine shut-down. In one example, an engine hot-start condition may be confirmed if an engine temperature and/or a catalyst temperature is above a threshold.

In response to an engine cold-start condition, at 210, the routine includes operating the engine with a first injection profile to expedite catalyst activation. Operating with the first injection profile includes, during a first combustion event since engine start, port injecting a portion of fuel during a closed intake valve event, and direct injecting a remaining portion of the fuel over multiple injection. Injecting the remaining portion of fuel over multiple injections may include direct injecting the remaining portion as at least an intake stroke injection and a compression stroke injection. For example, as elaborated with reference to FIG. 3, the direct injected portion of the fuel may be delivered as a first intake stroke injection and a second compression stroke injection. The injection amounts may be adjusted such that the port injection amount, the first intake stroke injection amount, and the second compression stroke injection amount are within 15% of each other. In one example, 30% of the fuel injection may be delivered as a port injection during a closed intake valve event (e.g., during an exhaust stroke), another 35% of the fuel injection may be delivered as an intake stroke direct injection, while a remaining 35% of the fuel injection is delivered as a compression stroke direct injection.

A first ratio of the port injection amount relative to a total direct injection amount may be adjusted based on an exhaust catalyst temperature. For example, as the catalyst temperature increases, a higher ratio of port injection may be used. The first ratio may be further based on the cylinder combustion event number at engine start. A second ratio of the first intake stroke injection amount relative to the second compression stroke injection amount may be adjusted based on the exhaust catalyst temperature and soot tendencies of the engine. The second ratio may be further based on the cylinder combustion event number at engine start. Herein, the relatively higher amount of direct injection may be advantageously used to heat the engine and catalyst, thereby expediting catalyst activation and improving engine and catalyst performance under engine cold-start conditions.

In addition to the first injection profile, spark timing may be retarded based on the exhaust catalyst temperature at the engine start. For example, to supply additional heat to the exhaust catalyst, the spark timing may be retarded further from MBT. The amount of spark retard applied may be further based on each of the first and second ratios. For example, as the first or second ratio increases, spark timing may be advanced or retarded for combustion stability. For most engines that are operating at extremely retarded spark, the second ratio is increased to a level for best combustion at least PM emission.

At 212, the routine includes continuing the port injecting and direct injecting over multiple fuel injections during cranking. In particular, the continuing is performed for a number of combustion events since the first combustion event, the number based on a cylinder event number. As such, the starting of an engine is a large transient event and having the ability to manage each event enables more robust engine performance and lower gaseous and particulate emissions. Further, since engine combustion chambers vary in capabilities, the routine's ability to manage each event enables a strategy that is flexible enough to work with different types of engines.

During engine start, the first event is fueled when the engine speed is around 150 to 200 rpm. Each event after that is fueled at a different engine speed. For low emission engines and power-trains, it is important to have flexibility in the fueling during engine start as the optimum emission/performance injection type and timing may be different for each event. For example, extreme cold starts can be a challenge for both Port and Direct Injection systems for different reasons. Port injection systems lose a lot of fuel into the crankcase. This dilutes the oil while the engine has trouble getting enough fuel to vaporize in cylinder to start. At extreme cold temperatures, the higher fuel pressure of direct injection works well to produce enough vaporized fuel to combust, but the displacement type high pressure fuel pump systems struggle to maintain fuel pressure at the high fuel demand of the cold start at low cranking speeds. Thus, at extreme cold starts, the first combustion cycle may have the port injection system supplementing the fuel so that the direct injection system can deliver appropriately sized compression injections for robust start at extreme cold temperatures. After a cycle, the engine speed may be sufficient for the direct injection high fuel pump to maintain the desired pressure for fuel vaporization and efficient combustion. At that point, the port injection of fuel can be suspended until the engine warms up.

As another example, a different fuel injection adjustment may be performed at the restart of an engine at operating temperature (or hot start). Here, for the quickest start, direct injection of fuel may be used for the first revolution. Then, port injection of fuel may be added. The result is a faster engine start with lower PM emissions. As yet another example, at extreme hot start temperatures, the fuel in the low pressure port injection fuel rail may become vapor while the direct injection high pressure keeps the fuel liquid. Thus, at extreme hot operating temperatures, the first cycle may have a low first ratio such that mainly direct injection is used to start the engine. Then, the first ratio may be increased, removing vapor from the port injection system and cooling the port fuel rail as cooler fuel comes into it.

At 218, it may be determined if the engine speed is higher than a threshold speed. In particular, it may be determined if cranking has been completed and an engine idling speed has been attained. If yes, then at 220, after cranking has been completed, the routine includes transitioning fuel injection to a second injection profile that enables idle speed control. This may include, for example, transitioning to one of only port injecting fuel or only direct injecting fuel. In one example, the injection profile may be transitioned to a port injection only injection profile for engine starts when the engine is above a (first) temperature threshold and below another (e.g., below a second threshold higher than the first threshold). In another example, the injection profile may be transitioned to a direct injection only injection profile for engine start below the (first) temperature threshold and above another threshold (e.g., a third threshold lower than the first threshold). In an alternate example, the transitioning includes, after cranking, transitioning fuel injection to port injecting a portion of fuel before the intake valve opens and direct injecting a remaining portion of the fuel during an intake stroke. Herein, the injection ratio of fuel direct injected to fuel port injected may vary based on fuel mass. As such, at 218, if the threshold engine speed has not been attained, then at 219, the injection profile being used at crank may be maintained.

It will be appreciated that while the routine of FIG. 2 shows a first injection profile being used for all engine cold starts, in alternate embodiments, the first injection profile may vary during engine cold starts based on the engine temperature at the time of the cold start. In particular, the first and second injection ratios of the first injection profile may vary based on the engine temperature at the time of the cold start (e.g., based on whether the cold start was a regular cold start or a very cold temperature cold start). For example, at regular engine cold-starts, the first injection profile may have a first and second injection ratio that is biased relatively equal while at very cold temperature cold starts, the first injection profile may have a first and second injection ratio that is biased relatively more towards direct injection.

Returning to 206, in response to an engine hot-start condition, at 214, the routine includes operating the engine with a second injection profile to improve robustness at extreme hot starts. Operating with the second injection profile includes, during a first combustion event since engine start, port injecting a (larger) portion of fuel during a closed intake valve event, and direct injecting a (smaller) remaining portion of the fuel over multiple injections. Injecting the remaining portion of fuel over multiple injections may include direct injecting the remaining portion as at least an intake stroke injection and/or a compression stroke injection. For example, as elaborated with reference to FIG. 3, the direct injected portion of the fuel may be delivered as a first intake stroke injection and a second compression stroke injection. The injection amounts may be adjusted such that the port injection amount, the first intake stroke injection amount, and the second compression stroke injection amount are within 15% of each other. In one example, 35% of the fuel injection may be delivered as a port injection during a closed intake valve event (e.g., during an exhaust stroke), another 35% of the fuel injection may be delivered as an intake stroke direct injection, while a remaining 30% of the fuel injection is delivered as a compression stroke direct injection. In another example, 50% of the fuel injection may be delivered as a port injection during a closed intake valve event, another 50% of the fuel injection may be delivered as an intake stroke direct injection, and with no fuel injection delivered for a compression stroke direct injection. In yet another example, 70% of the fuel injection may be delivered as a port injection during a closed intake valve event with no fuel injection delivered as an intake stroke direct injection, with the remaining 30% of the fuel injection delivered as a compression stroke direct injection. In a still further example, none of the fuel may be delivered as a port injection during a closed intake valve event, while 70% of the fuel injection is delivered as an intake stroke direct injection, and while a remaining 30% of the fuel injection is delivered as a compression stroke direct injection. In yet a further example, the port injection amount, the intake stroke direct injection amount, and the compression stroke direct injection amounts may be 0-100% of each other.

A first ratio of the port injection amount relative to a total direct injection amount may be adjusted based on engine coolant, or cylinder head measured or inferred temperature during the hot start. For example, as temperatures increase, a higher ratio of port injection may be used. The first ratio may be further based on the cylinder combustion event number. A second ratio of the first intake stroke injection amount relative to the second compression stroke injection amount may be adjusted based on engine coolant, or cylinder head measured or inferred temperature and a soot load of the engine. The second ratio may be further based on the cylinder combustion event number. Herein, the relatively higher amount of direct injection may be advantageously used to rapidly start the engine, thereby improving engine performance and fuel economy under engine hot-start conditions.

In comparison, if the engine and/or catalyst temperature has increased and is within a threshold region of the threshold temperature, then at 212, the controller may start transitioning the fuel injection to the engine cylinder from the relatively higher amount of port fuel injection to a relatively higher amount of direct fuel injection. The transition may be adjusted based on a distance of the engine and/or catalyst temperature from the threshold temperature. For example, once the temperature is within a threshold region of the threshold temperature, a rate of the transition may be increased as the distance from the threshold temperature increases. This may include, gradually deactivating the port injector, while gradually activating the direct injector, as the temperature approaches the threshold temperature. Thus, by the time the engine and/or catalyst temperature is at, or beyond, the threshold temperature, the fuel injection may have been transitioned to a higher amount of direct fuel injection and a smaller amount of port fuel injection. Herein, by using a higher ratio of direct injection as an engine load (and thus, engine temperature) increases, the charge cooling and improved fuel economy benefits of a direct injected fuel may be availed.

As an example, if the engine and/or catalyst temperature is above or within a threshold region of the threshold temperature, the controller may determine an engine hot start and correspondingly start transitioning the fuel injection to the engine cylinder from the relatively higher amount of port fuel injection to a relatively higher amount of direct fuel injection. The transition may be adjusted based on a distance of the engine and/or catalyst temperature from the threshold temperature. For example, once the temperature is within a threshold region of the threshold temperature, a rate of the transition may be increased as the distance from the threshold temperature increases. This may include, gradually deactivating the port injector, while gradually activating the direct injector, as the temperature approaches the threshold temperature. Thus, by the time the engine and/or catalyst temperature is at, or beyond, the threshold temperature, the fuel injection may have been transitioned to a higher amount of direct fuel injection and a smaller amount of port fuel injection. Herein, by using a higher ratio of direct injection as an engine temperature increases, the charge cooling and improved fuel economy benefits of a direct fuel injection fuel are achieved.

While the routine of FIG. 2 does not show performing any spark timing adjustments while operating the second injection profile, in alternate embodiments, in addition to the second injection profile, spark timing may be adjusted (e.g., retarded) based on engine speed and event at the engine hot start. For example, if engine speed increases rapidly per event, spark timing may be retarded further from MBT. The amount of spark retard applied may be further based on each of the first and second ratios. For example, as the first or second ratio increases, spark timing may be advanced with the first ratio and retarded depending on the second ratio.

In one example, spark timing adjustments may be selectively performed based on the fuel injection profile to compensate for torque transients. For example, in response to a decrease in amount of port fuel injection and increase in the amount of direct fuel injection, spark ignition timing may be retarded by an amount. In alternate embodiments, additionally or optionally, adjustments may be made to one or more of boost, EGR, VCT, etc. to compensate for torque transients.

At 216, the routine includes continuing the port injecting and direct injecting over multiple fuel injections during cranking. In particular, the continuing is performed for a number of combustion events since the first combustion event, the number based on a cylinder event number. As previously elaborated, during engine start, the first event is fueled when the engine speed is around 150 to 200 rpm, each event after that being fuel with a different engine speed. At extreme cold starts, the first combustion cycle may use port injection to supplement the fuel so that the direct injection system can deliver appropriately sized compression injections for robust start at extreme cold temperatures. After a cycle, the engine speed may be sufficient for the direct injection high fuel pump to maintain the desired pressure for fuel vaporization and efficient combustion. At that point, the port injection of fuel can be suspended until the engine warms up.

In one example, during the engine crank, the fuel injection profile may be adjusted based on the engine operating conditions as well as the fuel available in the fuel tank. In one example, as an engine speed, engine load, and/or desired torque increases during the crank, an amount of fuel injected through the direct injector may be increased while an amount of fuel injected through the port injector may be decreased. Herein, the direct injection of the fuel may provide higher fuel efficiency and higher power output. Additionally, when the fuel available for injection is an alcohol fuel, the direct injection of the fuel may be used to take advantage of the charge cooling properties of the alcohol fuel.

At 218, after cranking, the routine includes determining if the engine speed is higher than a threshold speed (such as above an engine idling speed). If so, the routine includes, at 220, transitioning fuel injection to a second injection profile that enables idle speed control, as elaborated previously. Else, at 219, the first injection profile being used at cranking may be maintained and continued until, an engine idle speed is reached.

In one example, during a first combustion event since engine start, a controller may port inject a portion of fuel during a closed intake valve event, and direct inject a remaining portion of the fuel over multiple injections of the first combustion event. Therein, as one example, the remaining portion may be injected as at least a first intake stroke injection and a second compression stroke injection. The port injection amount, the first intake stroke injection amount, and the second compression stroke injection amount may be adjusted to be within 0% to 100% of each other. In an alternate example, the remaining portion of fuel may be injected as multiple intake stroke injections, multiple compression stroke injections, or at least one intake stroke injection and at least one compression stroke injection.

A first ratio of the port injection amount relative to a total direct injection amount (that is, a sum of fuel direct injected over one or more intake strokes, a sum of fuel direct injected over one or more compression strokes, or a sum of fuel injected as at least an intake stroke injection and at least a compression stroke injection) may be adjusted based on one or more of an exhaust catalyst temperature and an engine temperature. A second ratio of the first intake stroke injection amount relative to the second compression stroke injection amount may then be adjusted based on the exhaust catalyst temperature, the engine temperature and a soot load of the engine. Each of the first and second ratios may be further based on a combustion event number since engine start.

The controller may also retard spark timing based on the exhaust catalyst temperature and engine temperature at the engine start. Therein, an amount of spark retard may be further based on each of the first and second ratios. The controller may then continue the port injecting and direct injecting over multiple fuel injections during cranking following the first combustion event. The continuing may be performed for a number of combustion events since the first combustion event during the cranking, wherein the number of combustion events for which the continuing is performed is based on a cylinder event number. After cranking, fuel injection may be transition to a third ratio of port injection to direct injection, and a fourth ratio of intake stroke injection to compression stoke injection. Herein, the third ratio may be different from the first ratio (e.g., larger or smaller), while the fourth ratio is different from the second ratio (e.g., larger or smaller). Alternatively, after cranking, fuel injection may be transitioned to port injecting a portion of fuel during a closed intake valve event and direct injecting a remaining portion of the fuel during the intake stroke or compression stroke.

FIG. 3 shows a map 300 of valve timing and piston position, with respect to an engine position, for a given engine cylinder. During an engine start, while the engine is being cranked, an engine controller may be configured to adjust a fuel injection profile of fuel delivered to the cylinder. In particular, fuel may be delivered as a first profile during the engine start, and then transitioned to a second, different profile following engine cranking. The differing fuel injection profiles may include a portion of the fuel delivered to the cylinder as port injection and a remaining portion of the fuel delivered to the cylinder as direct injection. Further, the direct injected portion of fuel may be delivered as a single intake stroke injection, a single compression stroke injection, or a combination thereof.

Map 300 illustrates an engine position along the x-axis in crank angle degrees (CAD). Curve 308 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 308, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 302 and 304 depict valve timings for an exhaust valve (dashed curve 302) and an intake valve (solid curve 304) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 306 (or simply, positive valve overlap), represented by a hatched region at the intersection of curves 302 and 304. In one example, the positive intake to exhaust valve overlap 306 may be a default cam position of the engine present during an engine cold start.

The third plot (from the top) of map 300 depicts an example fuel injection profile that may used at an engine start, during engine cranking, to reduce an amount of engine start exhaust PM emissions without degrading engine combustion stability. As elaborated herein, the injection profile is adjusted based on combustion event number since an engine start with a portion of fuel port injected (hatched block) and a portion of fuel direct injected (diagonally striped blocks).

In the depicted example, a fuel injection profile used during a first combustion event since engine start is depicted. Herein, the engine start is an engine cold start. An engine controller is configured to provide the total amount of fuel to the cylinder as a first port injection depicted at 312 (hatched block), a second direct injection depicted at 314 (diagonally striped block), and a third direct injection depicted at 316 (diagonally striped block). The first port injection 312 may include a first portion of fuel (P1) that is port injected at a first timing CAD1. In particular, the first portion of fuel is port injected during a closed intake valve event (that is, during the exhaust stroke). Then, a remaining portion of the fuel is direct injected over multiple injections. In particular, a second portion of fuel (D2) is direct injected as a first intake stroke injection at CAD2 while a third portion of fuel (D3) is direct injected as a second compression stroke injection at CAD3.

In addition to splitting the amount of fuel injected as a single port injection and multiple direct injections, a spark ignition timing may be adjusted. For example, spark timing may be advanced towards MBT during port only injection (as shown at 320), such as when the engine is started at extreme cold temperatures. As an alternate example, spark may be retarded with the addition of a direct compression injection (as shown at 318).

In the depicted example, the fuel injection profile includes a ratio of fuel port injected:fuel that is intake stroke direct injected:fuel that is compression stroke direct injected that is set to 30:35:35. Herein, by port injecting a portion of the fuel and direct injecting a remaining portion of the fuel, an exhaust catalyst temperature can be rapidly increased to a light-off temperature, improving engine performance at the engine cold-start. Further, by splitting the direct injection into at least a first intake stroke injection and at least a second compression stroke injection, the catalyst light-off temperature can be attained without raising exhaust particulate matter (PM) emissions and degrading engine combustion stability. This allows an engine start emissions to be improved while also improving fuel economy.

Now turning to FIG. 4, map 400 shows example fuel injection profiles 401-404 that may be used during an engine start, during cranking, and during engine idle control. As elaborated herein, the injection profiles may be adjusted based on a combustion event number since the engine start, as well as based on whether the engine start is a cold engine start or a hot engine start. As such, each injection profile depicts a timing of injection relative to a cylinder piston position. Based on the position of the cylinder's piston at any time in the engine cycle, fuel may be injected into the cylinder during an intake stroke (I), a compression stroke (C), a power stroke (P), or an exhaust stroke (E). The injection profile further depicts whether fuel was injected via port injection (hatched blocks), single or multiple direct injections (striped blocks), or both. Further, the injection profile depicts whether any spark timing adjustments were concurrently performed (e.g., use of spark retard).

A first example injection profile that may be used during an engine cold start is shown at 401. In particular, first injection profile 401 depicts fuel injection to a cylinder during a first cylinder combustion event (event1). During the engine cold start, a portion of fuel is injected into the cylinder as a first port injection (hatched block) during a closed intake valve event (that is, during an exhaust stroke of a previous cylinder combustion event) while a remaining portion of the fuel is injected as a first intake stroke direct injection and a second compression stroke direct injection (diagonally striped block). The injection amounts may be adjusted such that the port injection amount, the first intake stroke injection amount, and the second compression stroke injection amount are within 15% of each other. In one example, 35% of the fuel injection may be delivered as a port injection during a closed intake valve event (e.g., during an exhaust stroke), another 35% of the fuel injection may be delivered as an intake stroke direct injection, while a remaining 30% of the fuel injection is delivered as a compression stroke direct injection.

In addition to splitting the amount of fuel injected as a single port injection and multiple direct injections, a spark ignition timing may be adjusted. For example, at 401, spark timing (solid bar) may be 12 degrees before TDC during the port injection.

A second example injection profile that may be used during an engine hot start is shown at 402. In particular, second injection profile 402 depicts fuel injection to a cylinder during a first cylinder combustion event (event1') at hot start. The hot start may include an engine restart from idle stop for example. Alternatively, the hot start may include an engine restart from shut down where the engine has not been shut down for sufficiently a long duration (and has therefore not cooled down to ambient temperatures). During the engine hot start, no fuel is injected into the cylinder as a first port injection while all of the fuel is injected as a direct compression injection (striped block). The injection amounts may be adjusted such that the port injection amount, the first intake stroke injection amount, and the second compression stroke injection amount can be 0% to 100%. In comparison, 40% of the fuel injection may be delivered as a port injection during a start at normal ambient temperature, another 35% of the fuel injection may be delivered as an intake stroke direct injection, while a remaining 25% of the fuel injection is delivered as a compression stroke direct injection.

In addition to the single port injection during the engine hot start, spark ignition timing may be adjusted. For example, at 402, spark timing (solid bar) may be set at TDC compared to 12 degree before TDC for normal ambient temperatures.

A third example injection profile that may be used during engine cranking, and after an engine start (hot start or cold start), is shown at 403. In particular, third injection profile 403 depicts fuel injection to a cylinder for n number of cylinder combustion events since the first cylinder combustion event (events 2 through n). During the engine cranking, fuel injection is transitioned to a profile where a larger portion of fuel is port injected into the cylinder during a hot restart while a smaller remaining portion of the fuel is direct injected as intake/compression stroke injection. The injection amounts may be adjusted such that the port injection amount and the direct injection amount are 0% to 100% of each other. In one example, 70% of the fuel injection may be delivered as a port injection during the cranking while another 30% of the fuel injection may be delivered as a compression stroke direct injection.

In addition to splitting the amount of fuel injected as a single port injection and a single direct injection, spark ignition timing may be adjusted. For example, at 403, spark timing (solid bar) may be adjusted to 8 degrees before TDC.

A fourth example injection profile that may be used following engine start and cranking, and after an engine idle speed has been attained is shown at 404. In particular, fourth injection profile 404 depicts fuel injection to a cylinder for a number of cylinder combustion events since the completion of cranking (events n through m). During the engine idle control while the engine is warming up, fuel injection is transitioned to a profile where the portion of fuel port injected into the cylinder is similar to the remaining portion of fuel that is direct injected as an intake stroke injection. Further, no fuel is direct injected during the compression stroke. The injection amounts may be adjusted such that the port injection amount and the direct injection amount are within 0% to 100% of each other. In addition to splitting the amount of fuel injected as a single port injection and a single direct injection, spark ignition timing may be adjusted. For example, at 404, spark timing (solid bar) may be retarded 40 degrees from MBT during the port injection.

In one example, during an engine start and while cranking, based on a cylinder event number, fuel may be injected as a first port injection during a closed intake valve event, at least one direct injection during an intake stroke and at least one direct injection during a compression stroke. The amount of fuel injected in the first port injection, the second direct injection, and the third direct injection may be 0% to 100% of each other. The injecting may be continued during the engine start and cranking until a threshold cylinder event number is reached. Then, after the threshold cylinder event number, fuel injection may be transitioned to another closed intake valve port injection and at least one intake and compression stroke injection. Herein, a first ratio of port injection to direct injection after the threshold cylinder event number is reached may be different (e.g., larger or smaller) from the first ratio of port injection to direct injection before the threshold cylinder event number is reached. Likewise, a second ratio of intake stroke direct injection to compression stroke direct injection after the threshold cylinder event number is reached may be different (e.g., larger or smaller) from the second ratio before the threshold cylinder event number is reached.

After the threshold cylinder event number is reached, the first ratio of the port injection during the closed intake valve event to the direct injection during either the compression stroke or the intake stroke may be adjusted based on an exhaust catalyst temperature and engine temperature, with the first ratio of port injection to direct injection increased as the exhaust catalyst temperature increases. That is, after the threshold cylinder event number, as the exhaust catalyst temperature increases, a proportion of port injection in the injection profile may be increased.

In comparison, before the threshold cylinder event number is reached, the first ratio of the port injection during the closed intake valve event relative to the direct injection may be adjusted based on an estimated engine soot load, while the second ratio of the intake stroke injection relative to the compression stroke injection is based on the estimated engine soot load and the first ratio. In some embodiments, such as where the emission control device includes a particulate filter, the ratio may also be adjusted based on whether the engine is in a filter regeneration mode of non-regeneration mode. For example, during filter regeneration, the first and second ratios may be adjusted to favor the port injection of fuel. Then, as the engine runs at stabilized temperatures, the first and second ratios may be adjusted to favor first and second ratios that provide volumetric efficiency benefits and enable knock mitigation.

In an alternate example, an engine system may comprise an engine, a first port injector coupled to an engine cylinder, a second direct injector coupled to the engine cylinder, and a control system with computer readable instructions for operating the engine with different fuel injection profiles. For example, during a first cylinder combustion event, and based on a cylinder combustion event number since the first event, cylinder fuel injection may be transitioned from a first injection profile including a first port injection during a closed intake valve and a second direct injection including at least one intake stroke injection, to a second injection profile including at least one compression stroke direct injection. Herein, the first injection profile and second injection profile may be based on catalyst temperature, engine temperature and soot load, with a proportion of fuel direct injected in the compression stroke relative to the intake stroke being higher in the first injection profile as compared to the second injection profile.

In this way, by adjusting an engine fuel injection amount between a direct injector and a port injector based on the cylinder combustion event number and the catalyst temperature, the fuel efficiency and power output advantages of direct injection may be achieved in addition to the faster catalyst heating advantages of port injection, all without degrading exhaust emissions. The combination of simultaneous using port and direct injection fuel systems adds robustness to engine start performance at both extreme cold and hot conditions. In addition, at nominal ambient temperatures, the combination of simultaneous use of port and direct injection fuel systems enables emissions to be optimized, especially particulate emissions. As such, the use of turbocharging and direct injection for fuel efficient engines can increase particulate emissions. Thus, by simultaneously using port and direct injection fuel systems during engine start, catalyst warming, and engine warm-up can be achieved while enabling low PM emissions from engines and power trains, including turbocharged engine configurations.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be further appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising,
responsive to an engine cold-start and during a first combustion event since the engine cold-start:

port injecting a first portion of fuel during a closed intake valve event; and direct injecting a remaining portion of the fuel over multiple injections of the first combustion event at a first ratio of the first port injection portion relative to a total first direct injection amount; and responsive to an engine hot-start and during a first combustion event since the engine hot-start:

port injecting a second portion of fuel;

direct injecting a remaining portion of the fuel over multiple injections of the first combustion event at a second ratio, higher than the first ratio, of the second port injection portion relative to a total second direct injection amount; and wherein a first direct injection ratio of intake to compression injection during the cold-start is higher than a second direct injection ratio of intake to compression injection during the hot-start.

2. The method of claim 1, wherein injecting the remaining portion of fuel over multiple injections includes injecting the remaining portion as at least a first intake stroke injection and a second compression stroke injection.

3. The method of claim 1, wherein direct injecting the remaining portion of fuel over multiple injections includes injecting the remaining portion as multiple intake stroke injections, multiple compression stroke injections, or at least one intake stroke injection and at least one compression stroke injection.

4. The method of claim 1, wherein the first ratio of the first port injection portion relative to the total first direct injection amount is adjusted based on an exhaust catalyst temperature.

5. The method of claim 1, wherein the first and second ratios are adjusted based on a soot load of the engine.

6. The method of claim 5, wherein each of the first and second ratios are further adjusted based on a combustion event number subsequent to the first combustion event.

7. The method of claim 6, further comprising retarding spark timing based on an exhaust catalyst temperature and an engine temperature at the engine start.

8. The method of claim 7, wherein an amount of spark retard is further based on each of the first and second ratios.

9. The method of claim 1, further comprising continuing the port injecting and direct injecting over multiple fuel injections during cranking subsequent to the first combustion event.

10. The method of claim 9, wherein the continuing is performed for a number of combustion events since the first combustion event, the number based on a cylinder event number.

11. The method of claim 9, further comprising, after cranking, transitioning fuel injection to a third ratio of port injection to direct injection, and a fourth ratio of intake stroke injection to compression stoke injection, the third ratio different from the first ratio, and the fourth ratio different from the second ratio.

12. The method of claim 9, further comprising, after cranking, transitioning fuel injection to port injecting a portion of fuel during a closed intake valve event and direct injecting a remaining portion of the fuel during an intake stroke or compression stroke.

13. A method for an engine, comprising:
determining whether a start is a cold-start based on engine temperature below a threshold;
during the engine cold-start and while cranking,
based on a cylinder event number, injecting fuel as a first port injection during a closed intake valve event, at least one direct injection during an intake stroke, and at least one direct injection during a compression stroke at a first ratio of the first port injection portion relative to a total first direct injection amount;
determining whether a start is a hot-start based on engine temperature above the threshold;
during the engine hot-start and while cranking, injecting fuel as a second port injection during a closed intake valve event, at least one direct injection during an intake stroke, and at least one direct injection during a compression stroke at another ratio of the second port injection portion relative to the total first direct injection amount, the another ratio higher than the first ratio; and
wherein a first direct injection ratio of intake to compression injection during the cold-start is higher than a second direct injection ratio of intake to compression injection during the hot-start.

14. The method of claim 13, wherein injecting based on a cylinder event number includes continuing the injecting during the cold-engine start and cranking until a threshold cylinder event number is reached, and then transitioning fuel injection to another closed intake valve port injection and at least one intake and compression stroke injection, a ratio of port injection to direct injection after the threshold cylinder event number is reached is different than from before the threshold cylinder event number is reached, and a second ratio of intake stroke direct injection to compression stroke direct injection after the threshold cylinder event number is reached is different than from before the threshold cylinder event number is reached.

15. The method of claim 14, wherein after the threshold cylinder event number is reached, the first ratio of the port injection during the closed intake valve event to the total first direct injection amount is based on an exhaust catalyst temperature and engine temperature, the first ratio of port injection to direct injection increased as the exhaust catalyst temperature increases.

16. The method of claim 14, wherein before the threshold cylinder event number is reached, the first ratio is based on an estimated engine soot load.

17. An engine system, comprising:
an engine;
a first port injector coupled to an engine cylinder;
a second direct injector coupled to the engine cylinder; and
a control system with computer readable instructions for,
during a first cylinder combustion event, injecting both port and direct injected fuel at a ratio, the ratio lower at cold engine starts and higher at hot engine starts, wherein the direct injected fuel during the first cylinder combustion event is injected over multiple injections at a ratio of intake to compression direct injection, the ratio of intake to compression direct injection higher during the first combustion event of the cold engine starts than the first combustion event of the hot engine starts;
and based on a cylinder combustion event number since the first event, transitioning cylinder fuel injection from a first injection profile including a first port injection during a closed intake valve and a second direct injection including at least one intake stroke injection to a second injection profile including at least one compression stroke direct injection.

18. The system of claim 17, wherein the first injection profile and the second injection profile are based on catalyst temperature, engine temperature and soot load, and wherein a proportion of fuel direct injected in the compression stroke relative to the intake stroke is higher in the first injection profile as compared to the second injection profile.

* * * * *